March 30, 1948. P. W. BULLOCK 2,438,494
PHOTOGRAPHIC PROCESS FOR PRODUCING LINE IMAGES
Filed July 13, 1942
Fig. 1
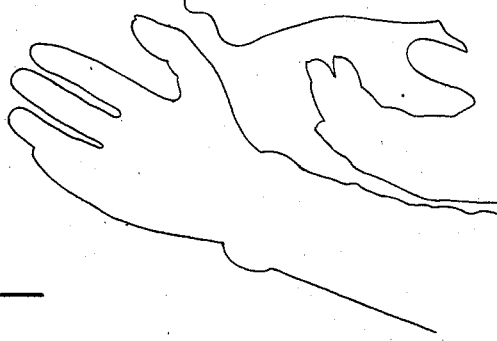
Fig. 5
___
Fig. 6
___
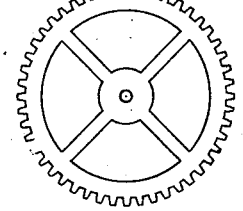
Fig. 2
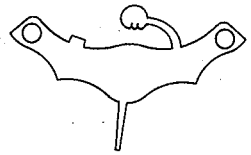
Fig. 3
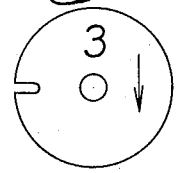
Fig. 4
Inventor:
PERCY WYNNE BULLOCK;
By
Attorney.

Patented Mar. 30, 1948

2,438,494

UNITED STATES PATENT OFFICE 2,438,494

PHOTOGRAPHIC PROCESS FOR PRODUCING LINE IMAGES

Percy Wynne Bullock, South Pasadena, Calif.

Application July 13, 1942, Serial No. 450,705

3 Claims. (Cl. 95—5)

This invention relates to photographic methods and processes.

Specifically the invention has to do with a method of photographic line control.

The inventor makes use of the phenomena known as photographic partial reversal, and so practices the invention as hereinafter detailed, as to produce a straight line photograph of one or more physical objects in which accurate control of line thickness and line rendering is possible, and at the same time retaining accurately all detail within the form of the object photographed.

In the various industries, notably where machine tools or parts, templates or dies must be produced, accurate drawings must be made of the particular tools by expert draftsmen. With the present invention, I photograph any object, regardless of its outline and plane surface complications, and produce a film upon which appears a line rendering of all outline and cut-out edges, as well as all detail within the form of the object. This photograph is equivalent to a drawing of the object. As an example, I may photograph a template and have on the resultant film a line drawing of the template. Within the practice of my invention, detail within the form photograph may or may not be reduced to a line.

In utilizing my method and process, I may use motion picture film or film in which the resultant picture is of very small dimension. The resultant photographs may be enlarged or projected onto a screen in the usual manner. Hence, a sheet or roll of small film will occupy very little space and may be filed. Such a method of retaining line photographs saves the necessity of producing a voluminous number of large drawings, such as must be produced under the present method for the manufacture of parts and the assembly of said parts in various industries, such as automotive, aircraft, and others.

An object of the invention is the provision of the method and process of photographically producing line drawings of an object, which is simple, speedy, and accurate.

At the present time when it is desired to photograph some object in detail, the background appearing as white in the finished photo-tracing negative, it is customary to first photograph the object to produce a negative, to make a positive from the negative, then provide a negative mask for use with the positive wherein the background is black and the object is clear film, followed by the production of a photo-tracing. In my process, I eliminate two of the first three steps required to produce the photo-tracing, in that I utilize a one-negative process and the photo-tracing is produced directly from the original negative. Therefore, a further object of my invention is to save the expense of film, chemicals, and the time of expert workmen in the producing of the resultant photograph desired.

Other objects of the invention will readily suggest themselves to those skilled in the art to which this invention appertains.

In the drawings:

Figure 1 is illustrative of a line photograph of a human being showing the head, hand, and a portion of the arm, utilizing my invention.

Figure 2 is a line photograph produced by photographing a gear,

Figure 3 is an outline of a watch part which has been photographed,

Figure 4 is a combined outline and surface detail of an object which has been photographed, Figure 5 is a line, and, Figure 6 is the line of Figure 5 photographed in accordance with the method of the invention.

In the practice of my invention, I take advantage of a partial reversal process. When a film is developed in the normal manner, a negative image of the object photographed is produced. If this film, before being fixed in hypo, is exposed to a weak light for a period of time, and then returned to the developing bath, certain changes take place in the light sensitive emulsion, to-wit, the weak light prints a latent positive image of the normal developing negative on the lower layers of the silver salts. Full reversal takes place when this positive image supersedes the negative image. The areas of the original negative image which had been most exposed to light during the original exposure and which, during the first period of developing, form the dark or dense areas of the negative film image, are the least sensitive to light. This is especially true of the outline edges of the dense areas and this relative lack of sensitivity to light of the outline edges of the dark or dense negative film area causes a line effect to take place, and which is typical of a good partial reversal.

I have determined that certain control factors are primarily essential in the practice of my method or process of obtaining partial reversal. Briefly, these factors may be stated as involving light control, and particularly differential lighting of the object, and the background for the object, considered together with film exposure. Focus control is also important as is the method of processing the film after it has been exposed. I may, in addition to the above, in the practice of the method of the invention, control contrast values of the objects being photographed, as hereinafter fully set forth.

First, considering differential lighting, this term is used in its ordinary significance and as applied by those skilled in the art, to-wit, differential lighting contemplates the amount of light on an object and on its background.

To explain this, reference is made to Figure 4 of the drawing. In Figure 4, it will be observed that the numeral 3, together with an arrow, appears on the surface of this particular part for a watch. This particular part is shown in line form, to-wit, there is a rendering of the edge and the center opening. The object may be placed on a base of ground glass, which is evenly lighted by a light placed therebeneath. The object itself may be painted red and the numeral 3, together with the arrow, scratched through the paint to expose the metal. The relative brightness values of the background, the object, and the scratched indicia on the object may be summarized somewhat as follows: The background may have approximately 60 units of light, and the center opening and the slot extending inwardly from the periphery of the object will likewise have 60 units of light because the background lighting shows therethrough. The red painted surface of the object will have a brightness value of 5 units and the metal showing through the scratched numeral 3 and the arrow has a brightness value of 20 units. The surface of the object should be lighted evenly. It is evident that the maximum light that may be used for the surface depends upon the reflecting value of the object itself which, in this instance, is low, due to the presence of the paint. The light reflected from the body surface of the object should never be so great as to destroy the necessary contrast between the object and its background. This differential contrast between the object with the detail thereon in relation to the background is first established by trial exposure and subsequent processing of the film, to the end that the contrast necessary for obtaining a correct negative with the resultant line for the outline and the cut-out portions will be obtained. Once the various light value contrasts are established, all factors of the process will remain the same and any number of objects may be reproduced in line and detail, thus permitting mass production with accuracy, speed and economy.

The outlines illustrated in Figures 1, 2 and 3, do not require differential lighting in the sense outlined for Figure 4. Referring to Figure 1, a strongly illuminated white background is provided and the face, arms and hand being unlighted. In certain instances, I may reverse the procedure and maintain the background unlighted, with care that no light strikes the background, and strongly illuminate the surface of the face, arms and hand or the object. Having determined the character of the lighting to be used, a meter reading of the background illumination is taken, or if the background is not illuminated, then a meter reading of the illuminated object. The film is then exposed at the speed indicated by the meter reading. I control line thickness by the even sharpness or softness of focus of the object, as well as by the evenness of the lighting and the character of the edges of the object itself. Thus, if I wish a very fine line, the focus must be very sharp.

Having photographed the object, I then process the negative. The negative is processed by first immersing the same in water containing a wetting agent, such as "Aresol." The wetting agent assures an even development of the negative. In certain instances, I may omit this step, although I prefer to use a wetting agent. The negative is then developed in the ordinary manner to a strong contrast, followed by immersing the negative in a second water bath containing a wetting agent. The surface water from the second bath is removed from the film in any approved manner, such as by squeegeeing. The negative is then exposed to light, such as the light emitted by a 25-watt ordinary house bulb, for one or two seconds, at a distance of approximately five feet from the bulb. The presence of the wetting agent on the unfixed negative renders the developer left on the negative relatively inactive and danger of uneven developmnt of the negative during the exposure to the light is reduced. Thereafter, the negative is placed back in the developer and developed until the density of the background portions of the negative and the density of the portions of the film reproducing the object are equal, or nearly equal. The line effect then appears. The negative is now placed in a rinse pan containing an acid, such as acetic, fixed, and washed in the conventional manner.

After the film has been processed, it is then printed on contrasting paper.

In Figure 5, I have shown a solid black line and by following the method of photographing and processing as heretofore set forth, I may produce the two lines shown in Figure 6.

In certain instances, it may not be desired to use a camera, in which event it is possible to use either a film, plate, or photographic paper, and simply place the object on the film, plate, or paper in the dark room and make the exposure by exposing the film, plate or paper to sufficient light to cause the exposed parts to be black when developed. Thereafter, this paper is developed to completion in any standard developer. The paper is then rinsed in water and exposed to the 25-watt house bulb for one or two seconds at a distance of 5 feet, and then placed again in the developer until partial reversal takes place, and a line marks the outline of the object. From this point on, the film or paper is rinsed in the acid bath, fixed, and washed in the normal manner.

In the practice of my invention, I may utilize an enlarger by placing the object itself between two sheets of clear glass. The image of the object is then projected as a silhouette (the object being opaque) onto any light sensitive material, such as a photographic plate or photographic paper. This step permits easy control of object size, object focus, and scale, and has many advantages over the method of using a camera for making a negative image of the object and then processing the negative for line rendering of the object because the focus control is easier in making enlargements of considerable size, the line thickness becomes independent of image size, and time and cost of making a negative of the object by use of a camera is eliminated. If a photographic plate has been used, this photographic plate is then developed, as heretofore set forth for the process method.

It is also within the purview of my invention to employ a second film or contrast photographic paper, in addition to the original negative. In this process, the object element is photographed before a background element on film, one of said elements being illuminated without illuminating the other. Preferably the speed of photographing is controlled in accordance with the illumination rating. The film is then developed and fixed and printed onto a second film or photostatic paper. The second film or paper is developed partially and then exposed to a weak light, after which the film or paper is further developed until partial reversal takes place and a well defined line marks the outline of the object element. This well defined line occurs when the opposing densities of the object element and the background element match or nearly match.

I claim:

1. A partial reversal line process, which consists in providing a background element and an object element, illuminating one of said elements with a light so as to create a strong even light contrast between said element and its background element; photographing said object element on film, developing and fixing said film, printing the image on said film on a second film, partially developing the second film to a point that a strong contrast is obtained between the density of the object element and the density of the background element; exposing said second film to a weak light; developing said second film until opposing densities of the two elements are approximately even; whereby contrast between the two elements is destroyed but an even clear line around the object element is obtained; fixing the second film at the moment the opposition densities of the two elements match, then washing and drying said film.

2. A partial reversal line process, which consists in providing a background element and an object element, illuminating one of said elements with a light so as to create a strong even light contrast between said element and its background element; photographing said object element on film; developing and fixing said film, printing the image on said film on a contrast photographic paper, partially developing the contrast photographic paper to a point that a strong contrast is obtained between the density of the object element and the density of the background element; exposing said contrast photographic paper to a weak light; developing said contrast photographic paper until opposing densities of the two elements are approximately even; whereby contrast between the two elements is destroyed but an even clear line around the object element is obtained; fixing the contrast photographic paper at the moment the opposition densities of the two elements match, then washing and drying said paper.

3. A partial reversal line process controlling line thickness through focus control which consists in providing a background element and an object element, illuminating one of said elements with a strong even light so as to create a strong even contract between them, photographing said object and background element on contrasting film, controlling line thickness by varying the degree of sharpness and softness of focus when focusing on the object element, developing said film in a film developer to a point that a strong contrast is obtained between the object element and the background element, exposing said film to a weak light, developing said film until the opposing densities of the two elements substantially match thereby destroying the contrast between the elements and obtaining a clear even line around the object element, the thickness having been determined by the aforesaid focus control, and fixing, washing and drying the film.

PERCY WYNNE BULLOCK.

REFERENCES CITED

The following references are of record in the file of this patent:

UNITED STATES PATENTS

| Number | Name | Date |
| --- | --- | --- |
| 1,697,315 | Handschiegl | Jan. 1, 1929 |
| 1,698,448 | Osann | Jan. 8, 1929 |
| 2,013,010 | Schoeu | Sept 3, 1935 |
| Re. 20,582 | Dreyer | Dec. 14, 1937 |
| 2,178,933 | Davis | Nov. 7, 1939 |
| 1,780,025 | Mankenberg | Oct. 28, 1930 |

FOREIGN PATENTS

| Number | Country | Date |
| --- | --- | --- |
| 840 | Great Britain | Mar. 20, 1872 |

OTHER REFERENCES

Clerc; Photography Theory and Practice, London, England, 1930; ibid., second edition, 1937, publication by Sir Isaac Pitman & Sons, Ltd., London, England.

British Journal of Photography, August 14, 1936.